UNITED STATES PATENT OFFICE.

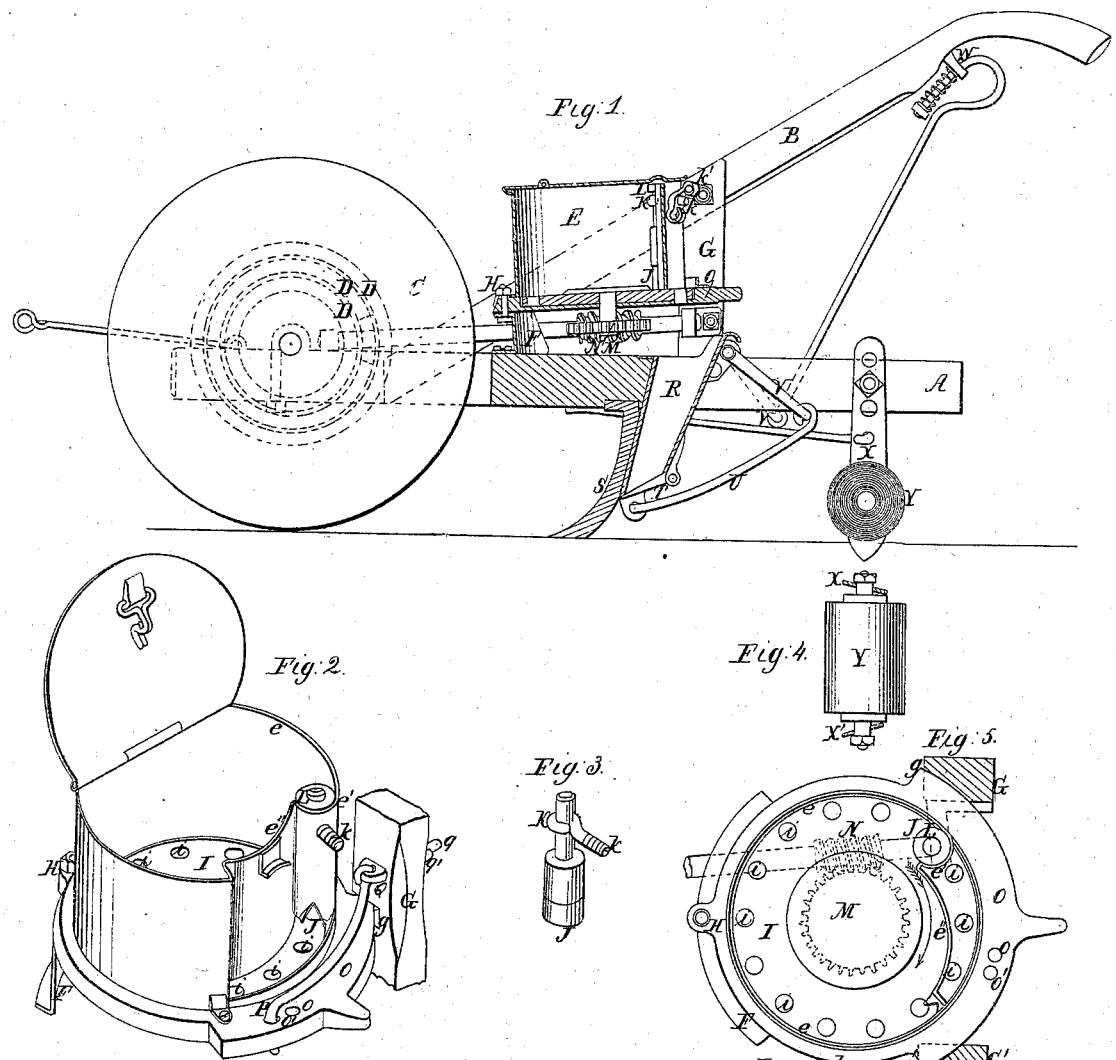

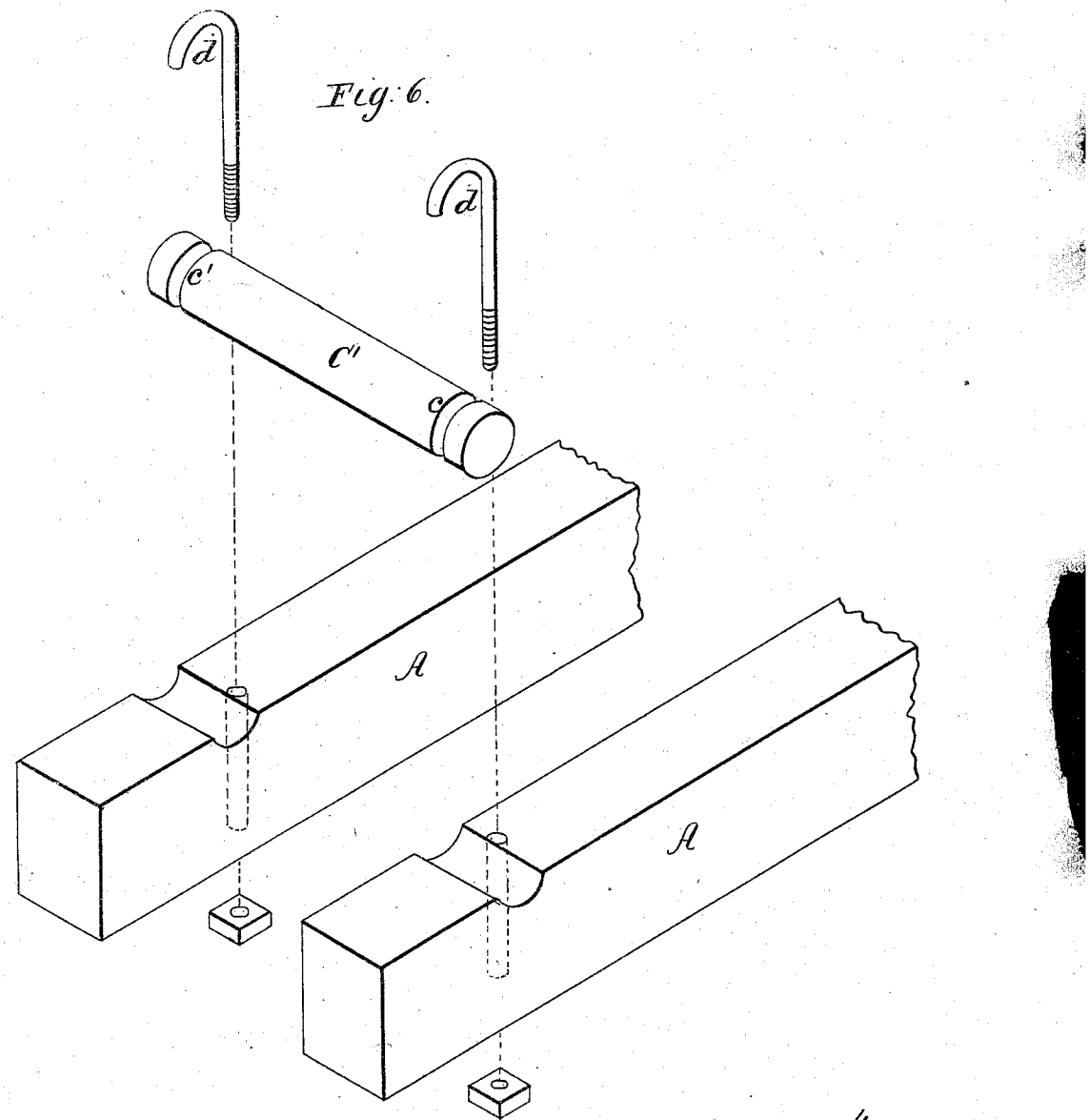

JAMES CAMPBELL, OF HARRISON, OHIO, ASSIGNOR TO HIMSELF AND WM. CAMPBELL, OF SAME PLACE.

IMPROVEMENT IN CORN-PLANTERS.

Specification forming part of Letters Patent No. 54,642, dated May 8, 1866.

*To all whom it may concern:*

Be it known that I, JAMES CAMPBELL, of Harrison, Hamilton county, Ohio, have invented a new and useful Corn-Planter; and I do hereby declare the following to be a full, clear, and exact description thereof, reference being had to the accompanying drawings, making part of this specification.

My invention relates to the class of grain-planting apparatus adapted to be drawn forward by horse or other animal power, and whose seed or grain is deposited automatically by motion derived from a ground-wheel; and my invention consists, chiefly, in devices for insuring the uniform and effective delivery of the grain, and for the ready increase, decrease, or suspension of the dropping operation.

Figure 1 is a partially-sectionized side elevation of a machine embodying my improvements. Fig. 2 is a perspective view of the grain-box. Fig. 3 shows the cut-off brush detached. Fig. 4 is a top view of the covering-roller. Fig. 5 is a horizontal section through the grain-box.

Fig. 1 shows the right-hand side and handle of a customary triangular two-handled frame, A B. Journaled to the front part of the frame A is a ground-wheel, C, having a series of concentric bevel-wheels. (See dotted lines D.) The grain-box E is pivoted in front to a curved plate, F, and at back is supported in two notches, $g$ $g'$, in as many posts, G G'.

The curved plate F, besides supporting the front end of the grain-box, is so connected to it by pivot-bolt H as to permit the box to be slightly shifted to the right or left, for a purpose presently explained. The notches $g$ $g'$ are also so formed as while supporting the rear portion of the grain-box to admit of the shifting operation. The curved plate F likewise serves the purpose of a fender to intercept and divert to either side all trash and dirt that would otherwise pass underneath the grain-box and clog the gearing and grain-passages.

The grain-box E is composed of an annular plate, O, which supports a body consisting of a number of cylindrical segments, $e$ $e'$ $e''$, of which the portion $e$ is concentric with a circular plate or disk, I, pierced at equal distances around its circuit with grain-measuring apertures $i$, each capable of receiving a single grain of corn. The portion $e'$ forms a semicircular recess for the reception of a common round brush, J, such as is used by painters. The brush J is held in position by means of a hook, K, having a screw-shank, $k$, and nut $k'$, and by a head, L, which fits and occupies the upper part of the recess $e'$. This arrangement permits the use of the cheap and easily renewed common circular brush, which brush, when worn or bent to one side, can be restored to efficiency by slackening the nut $k^4$ and partially rotating the brush, so as to present a new and unworn set of bristles to the action of the grain. The portion $e''$ of the box is arranged so much nearer the center of the latter as to expose a number of the apertures $i$ to the view of the operator. The portion $e''$ trends somewhat away from the center of the box, so as to permit an easy circulation of the grain in the direction of the arrow and to prevent the crowding of kernels underneath the edge of the box.

The disk or revolving grain-measurer I is furnished underneath with a worm-pinion, M, actuated by a worm-wheel, N, driven from the ground-wheel.

The annular plate O has two or more perforations, $o$ $o'$, to receive a hook, P, linked to an eye, Q, which eye has a screw-shank, $q$, and nut $q'$, by which it can be adjusted forward or backward, so that when the hook P is engaged in the perforation $o'$ the worm-gearing M N can be adjusted accurately in the mesh by means of the nut $q$. When, on the other hand, it is desired to disengage the seed-delivering mechanism, the hook P is withdrawn from the perforation $o'$, and, the box E being shifted to the left, the hook P is inserted in the perforation $o$, so as to hold the worm-movement out of gear.

The rotation of the seed-measurer causes a single grain at a time to drop at regular intervals into a spout, R, arranged immediately behind a drill-tooth, S. The lower end of the spout slopes obliquely upward from the rear of the drill-tooth, and is, when the implement is used for planting in hills, closed by a valve, T, connected by rods U and arms V with a spring-trigger, W.

X X' are two covering-shares, which are perforated to receive a roller, Y, which roller is applied when the implement is to be used for planting in sod.

The arrangement and position of the drill-tooth and dropping-spout are such as to protect the latter fom interference by clods or trash, the upward and rearward inclination of the valve T enabling trash to easily escape it, and also enabling the grain to be liberated near the ground by a very slight motion of the valve and without striking it against the ground.

My provision for adjusting the worm-gearing accurately to mesh enables the machine to be operated with more certainty and less labor than is usual with planters of this class.

I claim herein as new and of my invention—

1. A grain-box whose front portion is supported and pivoted upon a curved fender-plate, F, and whose rear portion is supported in notched posts G $g$ G$'$ $g'$, substantially as described.

2. The grain-box E $o$ $o'$, having the pivoted front and perforated rear portion, in the described combination with the adjustable hook P Q $q$ $q'$, for the purposes set forth.

In testimony of which invention I hereunto set my hand.

JAMES CAMPBELL.

Witnesses:
GEO. H. KNIGHT,
JAMES H. LAYMAN.